3,200,134
Δ¹,⁴-3,20-DIKETO-17α,20,21-TRIHYDROXY PREGNADIENES

Stefan Antoni Szpilfogel and Max Salomon de Winter, Oss, Netherlands, assignors to Organon Inc., West Orange, N.J., a corporation of New Jersey
No Drawing. Original application Mar. 8, 1957, Ser. No. 644,741. Divided and this application Aug. 10, 1964, Ser. No. 388,683
Claims priority, application Netherlands, Mar. 20, 1956, 205,581
3 Claims. (Cl. 260—397.45)

This invention relates to the preparation of new, biologically active, pregnane compounds, which have, in ring A, a double bond between the C-atoms 1–2 and 4–5, in 3-position a keto group, in the positions 17, 20, and 21 a hydroxyl group, and which can furthermore be substituted in the nucleus by e.g. one or more free or functionally converted hydroxyl or keto groups and by halogen and/or alkyl groups and in addition may have one or more other double bonds, and of functional derivatives of these compounds.

This application is a division of our application Serial No. 644,741, filed March 8, 1957.

The preparation according to the invention occurs by reduction of the 20-keto group of a non-, completely, or partially esterified $\Delta^{1,4}$ - 17α,21 - dihydroxy - 3,20-diketopregnadiene compound which may furthermore be substituted in the nucleus and may contain in addition one or more other double bonds, to the 20β-hydroxyl group by means of an alkali metal borohydride or an alkali metal trialkoxyborohydride.

With the process according to the invnetion, reduction of the 20-keto group of $\Delta^{1,4}$-3,20-diketo-pregnadiene to the 20β-hydroxyl group takes place without the double bonds present and the 3-keto group need to be protected, and a yield of more than 60% of the desired 20β-hydroxy products is obtained in which neither the 1-2 double bond nor the 3-keto group is reduced.

The reduction takes place at temperatures of between about —5° and +25° C. Preferably the reaction is carried out at about 0° C.

The reduction is carried out with an alkali metal borohydride such as potassium and sodium borohydride, or with an alkali metal trialkoxyborohydride, such as the sodium triethoxyborohydride. The application of a somewhat more than equimolar quantity of the reducing agent has proved to be very favorable.

As starting substances may serve $\Delta^{1,4}$-3,20-diketo-17α, 21-dihydroxy pregnadienes, which may further be substituted in the skeleton by e.g. free or functionally converted hydroxyl or keto groups, e.g. in the positions 6, 7, 11, 12, and 14 and/or by halogen atoms and/or alkyl groups e.g. in the positions 2, 6, 7, 8, 9, 11, 12, 14, and 16, and/or may contain one or more other double bonds e.g. between the C-atoms 6–7, 7–8, 8–9, 9–11, 11–12, and 14–15. The final products of the present process are important for their cortisone-like activity.

The preparation of the starting substances is disclosed in copending application Serial No. 587,946, filed May 29, 1956, and is also disclosed in Belgian Patent No. 548,288, granted on June 15, 1956.

As examples of starting products may be mentioned:

$\Delta^{1,4}$-17α,21-dihydroxy-3,11,20-triketo-pregnadiene;
$\Delta^{1,4}$-11β,17α,21-trihydroxy-3,20-diketo-pregnadiene;
$\Delta^{1,4}$-9α-fluoro-17α,21-dihydroxy-3,11,20-triketo-pregnadiene;
$\Delta^{1,4}$-9α-chloro-11β,17α,21-trihydroxy-3,20-diketo-pregnadiene;
$\Delta^{1,4,9(11)}$-17α,21-dihydroxy-3,20-diketo-pregnatriene;
$\Delta^{1,4}$-11α,17α,21-trihydroxy-3,20-diketo-pregnadiene,
and esters of these compounds.

The starting substances may e.g. be esterified with aliphatic, cyclo-aliphatic, aromatic, or araliphatic carboxylic acids whether or not substituted and having no more than 10 C-atoms, such e.g. as acetic acid, propionic acid, capronic acid, caprylic acid, cyclo-pentyl-propionic acid, cyclohexylbutyric acid, benzoic acid, and phenyl propionic acid.

The reduction of the 20-keto group according to the invention is carried out in a suitable organic solvent or a mixture thereof with water. As solvents may be used a lower aliphatic alcohol, such e.g. as methanol, ethanol, propanol, iso-propanol, and t-butanol, an ether, such e.g. as dimethyl ether, di-ethyl ether, methylethyl ether, or dioxane, or tetrahydrofurane, or a mixture of these solvents. Preferably methanol is used.

Under nitrogen atmosphere the reducing agent, e.g. NaBH$_4$, dissolved in the same solvent, is added to this solution. After stirring for some time the reaction mixture is acidified, e.g. with glacial acetic acid, then evaporated, and diluted with water. Subsequently the mixture is extracted with an organic liquid not mixable with water, such as chloroform, carbon tetrachloride, tetrachloro ethane, benzene, washed with a dilute alkali hydroxide solution and then with water. The extract is subsequently dried and evaporated, after which the desired, if necessary completely or partially esterified, 20β-hydroxy-pregnadiene compound is obtained. This product can be crystallized from e.g. methanol, and then, if necessary, be saponified or esterified.

Example 1

1 g. of $\Delta^{1,4}$-17α,21 - dihydroxy - 3,11,20 - triekto-pregnadiene-21-acetate is dissolved in 200 ml. of methanol. After cooling to 2° C. 143 mg. of NaBH$_4$, dissolved in 20 ml. of methanol, are added to this solution while stirring under nitrogen atmosphere. After stirring at 0–2° C. for 1 hour the reaction mixture is brought to pH 5.4 with glacial acetic acid, subsequently evaporated in vacuo to about 20 ml. and then diluted with 200 ml. of water. The solution is extracted with chloroform and the extract is washed with icy-cold 1 N NaOH and subsequently with water. After drying and evaporating the solvent, the crude $\Delta^{1,4}$-17α,20β,21-trihydroxy-3,11-diketo-pregnadiene-21-acetate is obtained. Crystallization from methanol yields the pure substance with a M.P. of 228–230° C.; $[\alpha]_D = +128°$ (in dioxane).

Acetylation wtih acetic acid anhydride in pyridine yields the 20,21-diacetate with the M.P. 239–240.; $[\alpha]_D = +146°$ (in dioxane).

The saponification with 1.1 equivalent alkali in methanol solution and under nitrogen atmosphere yields the free $\Delta^{1,4}$ - 17α,20β,21-trihydroxy-3,11-diketo-pregnadiene with a M.P. of 180° C. and $[\alpha]_D = 111°$ (in dioxane).

The reduction of $\Delta^{1,4}$-17α,21-dihydroxy-3,11,20-triketo-pregnadiene-21-acetate to the corresponding 20-hydroxy compound has also been performed by means of potassium borohydride and sodium triethoxy-borohydride.

Example 2

1 g. of $\Delta^{1,4}$-11$\beta$,17$\alpha$,21-trihydroxy-3,20-diketo pregnadiene is dissolved in 200 ml. of methanol. At 0° C. a solution of 143 mg. of NaBH$_4$ in 20 ml. of methanol is added to this solution. After stirring at 0–2° C. for 1 hour the reaction mixture is processed as described in Example 1. After acetylation the 20,21-diacetate of the $\Delta^{1,4}$-11$\beta$,17$\alpha$,20$\beta$,21-tetrahydroxy-3-keto pregnadiene is obtained with a M.P. of 243–245° C.; [$\alpha$]$_D$=+110° (in dioxane). The free compound is obtained after saponification with 1.1 equivalent sodium hydroxide solution in methanolic solution under nitrogen atmosphere.

The reduction of $\Delta^{1,4}$-11$\beta$,17$\alpha$,21-trihydroxy-3,20-diketo pregnadiene to the corresponding 20-hydroxy compound has also been performed by means of potassium borohydride and sodium trimethoxy-borohydride.

Example 3

In the same manner as given in the Examples 1 and 2, other $\Delta^{1,4}$-3,20-diketo-17,21-dihydroxy-pregnadienes including $\Delta^{1,4,6}$ - 17$\alpha$,21 - dihydroxy-3,11,20-triketo-pregnatriene-21-propylate; $\Delta^{1,4}$ - 11$\beta$,17$\alpha$,21 - trihydroxy-3,20-diketo-9$\alpha$-fluoro-pregnadiene - 21 - $\beta$ - phenylpropionate; $\Delta^{1,4,9(11)}$-17$\alpha$,21-dihydroxy-3,20 - diketo-pregnatriene and $\Delta^{1,4}$-17$\alpha$,21-dihydroxy - 3,11,20 - triketo-2-methyl-pregnadiene have been reduced to the corresponding 20-hydroxycompounds by means of sodium borohydride, potassium borohydride and sodium triethoxyborohydride.

We claim:
1. A compound of the formula:

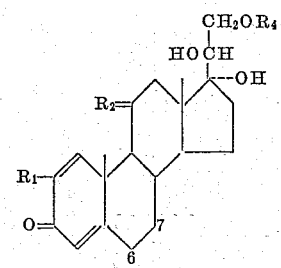

wherein R$_1$ is selected from the group consisting of hydrogen and methyl, R$_2$ is =O, R$_4$ is selected from the group consisting of hydrogen and acyl containing from 1 to 10 carbon atoms, and the bond between the carbon atoms 6 and 7 is selected from the group consisting of a saturated linkage and a double bond.

2. $\Delta^{1,4}$,17$\alpha$,20$\beta$,21 - trihydroxy-3,11-diketo-pregnadiene-21-acetate.

3. $\Delta^{1,4,6}$ - 17$\alpha$,20$\beta$,21 - trihydroxy - 3,11-diketo-pregnatriene-21-propionate.

References Cited by the Examiner
UNITED STATES PATENTS

| | | | |
|---|---|---|---|
| 2,837,464 | 6/58 | Nobile | 260—397.45 |
| 2,852,538 | 9/58 | Scheri et al. | 260—397.45 |
| 2,873,271 | 2/59 | Korman et al. | 260—239.5 |

LEWIS GOTTS, *Primary Examiner.*